United States Patent [19]
Ventura et al.

[11] Patent Number: 6,013,185
[45] Date of Patent: Jan. 11, 2000

[54] RECOVERY AND REUSE OF NONIONIC SURFACTANTS FROM AQUEOUS SOLUTIONS

[75] Inventors: Mark E. Ventura, Freehold; Manilal S. Dahanayake, Princeton Junction, both of N.J.

[73] Assignee: Rhodia Inc., Cranbury, N.J.

[21] Appl. No.: 08/936,826

[22] Filed: Sep. 25, 1997

[51] Int. Cl.[7] .................................................. B01D 61/00
[52] U.S. Cl. ........................... 210/651; 210/653; 134/10; 134/13
[58] Field of Search .................... 210/650, 651, 210/652, 653, 654; 134/10, 13, 110

[56] References Cited

U.S. PATENT DOCUMENTS

| | | | |
|---|---|---|---|
| 3,625,782 | 12/1971 | Oberth et al. | 149/19 |
| 4,111,812 | 9/1978 | Baddour | 210/257 |
| 4,201,664 | 5/1980 | Hekal | 210/654 |
| 4,293,428 | 10/1981 | Gale et al. | 252/353 |
| 4,430,171 | 2/1984 | Lemke et al. | 204/43 T |
| 4,738,781 | 4/1988 | Word et al. | 210/651 |
| 4,846,976 | 7/1989 | Ford | 210/636 |
| 4,891,159 | 1/1990 | Nadolsky | 252/545 |
| 4,892,660 | 1/1990 | Sweet | 210/637 |
| 5,026,891 | 6/1991 | Colas et al. | 556/413 |
| 5,049,282 | 9/1991 | Linder et al. | 210/651 |
| 5,205,937 | 4/1993 | Bhave et al. | 210/651 |
| 5,207,917 | 5/1993 | Weaver | 210/651 |
| 5,232,460 | 8/1993 | Botz | 8/141 |
| 5,259,960 | 11/1993 | Beck et al. | 210/638 |
| 5,324,425 | 6/1994 | Ellison | 210/167 |
| 5,326,906 | 7/1994 | Tetzlaff et al. | 562/11 |
| 5,348,588 | 9/1994 | Winston | 134/10 |
| 5,352,363 | 10/1994 | Shibano | 210/651 |
| 5,372,723 | 12/1994 | de Geus et al. | 210/651 |
| 5,401,571 | 3/1995 | Shiraki et al. | 428/336 |
| 5,525,371 | 6/1996 | Sweeney et al. | 210/651 |
| 5,654,480 | 8/1997 | Dahanayake et al. | 564/292 |
| 5,820,690 | 10/1998 | Rolchigo et al. | 134/30 |
| 5,843,317 | 12/1998 | Dahanayake et al. | 210/651 |
| 5,919,372 | 7/1999 | Galante et al. | 210/708 |

FOREIGN PATENT DOCUMENTS

| | | |
|---|---|---|
| 0 402 981A2 | 12/1990 | European Pat. Off. . |
| 0 441 175A2 | 8/1991 | European Pat. Off. . |
| 02254742 | 11/1992 | Japan . |

*Primary Examiner*—Ana Fortuna
*Attorney, Agent, or Firm*—Craig M. Bell; John Daniel Wood

[57] ABSTRACT

Contaminated aqueous systems can be cleaned using an ultra-filtration system that allows for high recovery yields of the surfactant employed therein for recycle and reuse. The system employs specific nonionic surfactants which remain polar and solvated at the higher operating temperatures of the system. The surfactant/contaminant containing aqueous system is ultra-filtered resulting in the surfactant passing through with the permeate at extremely high yields for recovery and reuse.

14 Claims, No Drawings

RECOVERY AND REUSE OF NONIONIC SURFACTANTS FROM AQUEOUS SOLUTIONS

BACKGROUND OF THE INVENTION

This invention relates to the unexpected discovery of a class of surfactants which demonstrate improved surfactant recovery from aqueous solutions upon ultrafiltration.

Because of environmental and economic concerns, it is important to remove and desirably, recover for reuse the active ingredients from aqueous by-product or waste solutions. The recovery and recycling of surfactants from treated aqueous solutions not only reduces or eliminates the discharge of contaminated water into the environment but also reduces the overall cost of industrial processes. This is of particular importance in processing aqueous solutions containing surfactants as they can be a costly component of the solution.

Ultrafiltration equipment can be used to overcome certain waste disposal problems in connection with aqueous solutions, whether using polymeric or sintered metal/sintered metal oxide filters. The economics of these processes in recovering surfactants have been seriously hampered since many of the conventional surfactants are not recoverable in the permeate. The ability to recycle and reuse these surfactants from aqueous solutions is significantly reduced thereby necessitating the addition of more surfactant to bring the amount in solution to the original level. This is a significant problem in the treatment of contaminated water systems since the loss of the original surfactant and the subsequent need for the addition of more becomes expensive.

Waste water treatment systems have been disclosed that claim significant recovery of water-based cleaning systems in the permeate upon ultrafiltration although in reality considerable dissatisfaction has been expressed concerning the filterability and recovery of existing water-based cleaning formulations. Whereas U.S. Pat. No. 5,205,937 to Bhave et. al. asserts to disclose aqueous cleaning systems wherein high percentages of the cleaner passes through the filter in the permeate for recycling, the amount of cleaner in the permeate is measured by HCl titration which is actually a measure of the caustic or sodium hydroxide present, not the surfactant. Most of the nonionic surfactants disclosed therein do not in fact pass through the membrane.

It is known that certain sultaine surfactants as disclosed in U.S. Pat. No. 4,891,159 to Nadolsky provide effective surfactant properties in highly alkaline cleaning solutions making them useful in paint stripping compositions, hard surface cleaners, oven cleaners, wax strippers, degreasers, aluminum cleaners, bottle washing compositions and at lower alkalinity, laundry and dish washing detergents and hand cleansers. However, these surfactants are not taught to provide any significant benefits when used in connection with an ultrafiltration-based water treatment and surfactant separation and recovery system.

As discussed above, U.S. Pat. No. 5,205,937 to Bhave et al. discloses a method for the recovery of a surfactant-containing solution from an aqueous contaminant stream using nonionic surfactants, among others. Whereas high yields of cleaning formulation is asserted to be recovered from the permeate, the amount that comprises the surfactant is really unknown since only the amount of sodium hydroxide present in the system is determined through the titration of the permeate with hydrochloric acid.

U.S. Pat. No. 5,654,480 to Dahanayake et al. on the other hand discloses the use of certain amphoteric surfactants, namely sultaines, in aqueous contaminant-containing streams. These surfactants, due to the nature of their pH dependent charge, are able to pass through the ultra-filtration membrane and are recovered in the permeate in very high amounts.

The present invention is directed to the finding that surfactant-containing aqueous compositions containing a certain class of nonionic surfactants unexpectedly provide improved surfactant recovery in the permeate after ultrafiltration. More particularly, it is discovered that a certain class of polyoxyethyleneated phenols, glycols, alcohols and natural fatty acid ester surfactants provide superior surface activity in aqueous cleaner systems while at the same time are able to pass through the filtration membranes for efficient recycling capabilities.

SUMMARY OF THE INVENTION

It has unexpectedly been found that increased surfactant recovery can be obtained upon ultrafiltration of contaminated aqueous solutions containing certain nonionic surfactants which, when ultrafiltered, are able to pass through the ultrafiltration membrane resulting in increased surfactant recovery. More specifically, the present invention relates to a process for the recovery of high yields of several specific nonionic surfactants from the permeate of a recyclable cleaning system wherein said nonionic surfactants remain polar and are solvated at the higher operating temperatures of the ultrafiltration process.

The present invention also provides a process for the filtration of contaminants from an aqueous surfactant/contaminant-containing solution by passing it through an ultrafiltration membrane, preferably a metal oxide membrane on a ceramic support.

In another aspect, the present invention relates to a process for separating a surfactant in an aqueous solution containing contaminants such as oils, greases, waxes, emulsified lubricants, etc., by passing the solution cross-flow through a multi-channel sintered monolithic metal/metal oxide ultrafiltration membrane on a ceramic support to form a permeate of surfactant for recovery. The sintered metal oxide membrane has a nominal pore size in the range of about 50 to 1000 Angstroms.

DETAILED DESCRIPTION OF THE INVENTION

In an effort to provide superior water treatment recycle systems, it has been unexpectedly and surprisingly discovered that a high degree of surfactant recovery can be obtained using standard ultrafiltration membranes with certain aqueous nonionic surfactant systems. The particular nonionic surfactants useful in the process of the present invention are added to the contaminant-containing wastestream at standard operating temperatures and while the surfactants pass through the ultrafiltration membrane and are recovered in high concentrations in the permeate, the contaminants and other materials are held back by the filter in the retentate.

In general, the majority of non-ionic surfactants used in industry are non-polar at the standard operating temperatures of most ultra-filtration processes. In the non-polar state, these surfactants are not water soluble and are more oil-like when mixed in an aqueous system. As a result, most if not nearly all nonionic surfactants which otherwise exhibit superior surface active properties cannot pass through the ultra-filtration membranes to a large degree and are not easily recoverable from the system for recovery and re-use.

The vast majority of the non-polar cleaners used in the prior art face this problem.

Without being bound by any theory, it is believed that when surfactants are mixed in aqueous systems, the surfactant becomes solubilized by forming hydrogen bonds with the surrounding water molecules. The surfactant thereby becomes hydrated. As the temperature of the system is increased, the surfactant/water hydrogen bonds are broken and the surfactant becomes dehydrated. This is known as the dehydration or cloud point. As this occurs, the non-polarity or hydrophobicity of the surfactant molecule increases and the molecules become insoluble in water but highly soluble in oil.

The temperature at which a solubilized surfactant's hydrogen bonds with water break is the dehydration point or cloud point for that surfactant. Whereas most compounds become more water soluble as the temperature of the system is increased, non-ionic surfactants exhibit reverse solubility characteristics; i.e. increasing the temperature of the aqueous solution renders them less water soluble. The present invention utilizes certain nonionic surfactants whose dehydration point is either above that of the temperature at which the ultra-filtration process is run or that of the boiling point of water. These surfactants then, as opposed to other non-ionic surfactants known in the art, retain their polarity, thereby maintaining the hydrogen bonds with the surrounding water molecules. They therefore remain solubilized in water and will pass through the ultrafiltration membrane so as to be easily recoverable at high concentrations from the permeate.

Nonionic surfactants useful in the process of the present invention include polyoxyethenated alkylphenols of the general formula:

$$RC_6H_4O(C_2H_4O)_xH$$

wherein R is a straight or branched chain $C_6$ to $C_{12}$ alkyl and x is a whole integer of from about 10 to about 40. In particular, these include the tristyrlphenol ethoxylates.

Other suitable nonionic surfactants useful in the practice of the present invention include polyoxyethyleneated polyoxypropylene glycols of the formula:

$$R-O(C_2H_4O)_xH$$

wherein R represents a straight or branched chain $C_6$ to $C_{14}$ alkyl, alkylene, aryl and alkylaryl, and x is a whole number of from about 9 to 40. Particular examples include the polyoxyethyleneated glycol esters and acetylenic glycols.

Still other nonionic surfactants contemplated as useful in the practice of the present invention include polyoxyethyleneated mercaptans of the general formula:

$$R-S-O(C_2H_4O)_xH$$

wherein R represents a straight or branched chain $C_6$ to $C_{14}$ alkyl, alkylene, aryl and alkylaryl and x is a number of from about 9 to 14.

Another group of nonionic surfactants that remain polar and solvated at these higher temperatures include the straight or branched chain polyoxyethyleneated alcohols of the general formula:

$$R-O(C_2H_4O)_xOH$$

wherein R is a $C_6$ to $C_{14}$ straight or branched chain alkyl, alkylene, aryl or alkylaryl and x is a whole integer of from about 10 to 40.

Still, a fifth group of nonionic surfactants useful in the practice of the present invention include the glyceryl and polyglyceryl esters of natural fatty acids with the structural formula:

$$R-\overset{\overset{\displaystyle O}{\|}}{C}-O(C_2H_4O)_xH$$

wherein R represents a straight or branched chain $C_6$ to $C_{14}$ alkyl, alkylene, aryl or alkylaryl.

Other miscellaneous non-ionic surfactants useful in the practice of the present invention include alkanol amine condensates, alkanolamides, polyoxyethyleneated silicones, alkyl amines, long chain acetates of polysaccharides, ethoxylated sorbitol esters, η-alkyl pyrrolidones, alkyl polyglucamides, ethylene propylene oxide copolymers (>60% EO) and mixtures thereof.

The surfactant-containing solutions of the invention can contain, in addition to the surfactants described hereinbefore, other materials such as silicates, phosphates, pyrophosphates and polyphosphates, for example, in the form of the sodium salts. Other additives that may be present include the $C_1$–$C_6$ lower alcohols, glycols, glycol ethers, chelating agents, and thickeners such as amides, cellulose derivatives, builders such as phosphates and sequestering agents/buffers and polyacrylates. In some cases, additional anionic, nonionic, zwitterionic or cationic surface active agents including corrosion inhibitors and hydrotropes can also be present. Agents to reduce foaming may also be useful in certain applications. Additional surfactants that can be incorporated in minor amounts are the alkyl sulfates, alkyl sulfonates, phosphate esters, alkyl carboxylates, nonylphenol ethoxylates, alcohol ethoxylates, ethoxylated fatty acid amides and alkyl quaternary ammonium compounds.

Typically, aqueous surfactant-containing solutions utilized in accordance with the invention can contain surfactants in amounts ranging from 0.01 to 40, and preferably from about 0.1 to 10, active percent by weight of the solution. Concentrated solutions, generally designed for dilution can contain higher percentages, such as up to about 40% active weight percent of surfactants.

The solutions of the present invention can be filtered, preferably using a polymeric, ceramic or metal/metal oxide sintered filter on a ceramic backing. For example, an ultra-filtration membrane system can include a feed tank and a separation membrane unit that is composed of a metal oxide membrane, e.g., titanium or zirconium oxide, optionally, with a yttrium oxide stabilizer, on a ceramic carrier, e.g., alpha-alumina with or without titanium dioxide having 1 or more channels on a monolithic support. The flux should be maintained at levels to allow soils to be concentrated in the retentate with minimal fouling through extended operating times while passing the surfactant-containing solution through the filter to be recovered in the permeate for recycling and reuse. While an effective pore size is easily determinable by a skilled artisan, nominal pore sizes of less than about 1,000 Angstroms and preferably less than about 500 Angstroms can be used. The rate of filtering can vary depending on filter pore size, pressure, temperature and the like.

As used herein, the term "contaminants" may include, either singly or in mixtures, oils used in metal stamping, forming, bending, grinding, drilling, machining, and polishing; low to medium molecular weight hydrocarbons; paraffinic soils; waxes; petrolatum; non-chlorinated high viscosity hydrocarbons; chlorinated and sulfurized hydrocarbons;

mineral oils; and vegetable oils. Also included in this term are materials which are partially soluble in the aqueous solution or which form stable micro-emulsions in water such as polyethylene and polypropylene glycol, oil-surfactant blends, water-soluble cutting fluids, machining coolants, unsaturated mono-, di-, and triglycerides, animal fats, fatty acids, and esters. The term "contaminants" also includes insoluble solids such as extremely fine structural material particulates; inorganic, inert, or elemental solid particulates; and metal oxide particulates not dissolved by the particular surfactant-containing aqueous solution.

The following examples are provided to disclose particular methods in which one skilled in the art might practice specific embodiments of the present invention. They are for illustrative purposes only, and it is recognized that minor changes and variations might be made with respect to the compositions and the process parameters employed. It is to be understood then that to the extent any such changes or variations do not materially change the process and the final results achieved thereby, such changes are deemed to fall within the spirit and scope of the invention as later defined by the claims.

EXAMPLE I

Filterable surfactants were evaluated against a commercially available composition by comparing the concentration of surfactant in solution at pH 12 before and after passing through an ultrafiltration membrane filter, KERASEP (sold by Tech Sep). The two surfactants useful in the practice of the present invention were a nonylphenol ethoxylate (1) and a tridecyl alcohol ethoxylate (2). These were compared with two standard commercially available nonionic surfactants, Brulin Two gallons of each surfactant solution of an activity as stated in the tables was prepared and charged into the working tank of the filtration unit. The working tank solution was heated and maintained at 52±2° C. during the operation. The working tank solution was circulated through the membrane. The inlet pressure was adjusted to 20 psi. The retentate and permeate were looped back to the working tank so that the concentration of working tank solution was constant all the time. Sample solutions were collected from the permeate and working tank at set time intervals. The percentage of surfactants that permeated through the filter was expressed as the ratio of permeate concentration to working tank concentration. The surfactant concentrations were determined by surface tension measurement techniques.

TABLE 1

PERCENTAGE OF A NONYLPHENOL
ETHOXYLATE SURFACTANT (40 MOLES EO)
PASSING THROUGH THE MEMBRANE
(Initial conc. (Ci) = 0.12% active, 0.1 μm pore size)

| Min | Concentrate of Permeate (CP) (wt % active) | Cp/Ci(%) (wt % active) |
|---|---|---|
| 5 | 0.048 | 40.2 |
| 30 | 0.041 | 34.2 |
| 60 | 0.039 | 32.5 |
| 120 | 0.032 | 26.8 |
| 240 | 0.02 | 16.6 |

Surfactant dehydration/cloud point > 100° C.

As can be readily seen from the results, the weight % of the active surfactant recovered from the permeate is 4x that of the amounts recovered using the surfactants and processes of the prior art.

TABLE 2

PERCENTAGE OF A TRIDECYL ALCOHOL
ETHOXYLATE SURFACTANT (20 MOLES EO)
PASSING THROUGH THE MEMBRANE
(Initial conc. (Ci) = 0.12% active, 0.1 μm pore size)

| Min | Concentrate of Permeate (CP) (wt % active) | Cp/Ci(%) (wt % active) |
|---|---|---|
| 5 | 0.045 | 37.5 |
| 30 | 0.036 | 29.2 |
| 60 | 0.029 | 24.5 |
| 120 | 0.025 | 20.8 |
| 240 | 0.018 | 15.0 |

Surfactant dehydration/cloud point > 100° C.

Again, the weight percent of surfactant recoverable is considerably greater than that of the prior art.

TABLE 3

PERCENTAGE OF BRULIN 63G
PASSING THROUGH THE MEMBRANE
(Initial conc. (Ci) = 3% Brulin 63G,
pH = 'as is'active, 0.1 μm pore size)

| Min | Concentrate of Permeate (CP) (wt % active) | Cp/Ci(%) (wt % active) |
|---|---|---|
| 5 | 0.316 | 10.5 |
| 30 | 0.309 | 10.3 |
| 60 | 0.302 | 10.1 |
| 120 | 0.288 | 9.6 |
| 240 | 0.251 | 8.4 |

Surfactant dehydration/cloud point > 30° C.

TABLE 4

PERCENTAGE OF SURFACTANT IN AQUATEK RP2000
PASSING THROUGH THE MEMBRANE
(Initial conc. (Ci) = 0.25% active, pH = 12, 0.1 μm pore size)

| Min | Concentrate of Permeate (CP) (wt % active) | Cp/Ci(%) (wt % active) |
|---|---|---|
| 5 | 0.030 | 12.0 |
| 30 | 0.028 | 11.2 |
| 60 | 0.025 | 10.0 |
| 120 | 0.021 | 8.4 |
| 240 | 0.020 | 8.4 |

Surfactant dehydration/cloud point >18° C.

As can be seen from the data in Tables 1 and 2, a large proportion, generally between about 25% and as high as about 40% of the surfactant compositions of the present invention, passes through the ultrafiltration membrane and is captured in the permeate. The data in Tables 1 and 2 demonstrate that the permeate of an aqueous surfactant/contaminant-containing solution that comprises a surfactant of the present invention can be effectively recycled for reuse. This high recovery of the surfactant also reduces the pressure on the environment that would otherwise occur without surfactant recovery.

In contrast, the data in Tables 3 and 4 shows that only a very small amount of the known, commercially available nonionic surfactants from an aqueous surfactant/contaminant-containing solution pass through the ultrafiltration membrane and become part of the permeate. The working solutions were prepared as before using a sufficient amount of the commercial solution to provide an initial concentration (calculated) of about 3% with an "as is" pH.

The commercial products, one of which is Brulin 63G, is thought to contain a blend of sodium xylene sulfonate, potassium phosphate, sodium silicate and two nonionic surfactants (mol. wt. about 2750 and about 910 respectively) having an alcoholic chain of about $C_{10}$ and about 50 moles of EO/PO (about 32 mol. EO/18 mol. PO randomly distributed). The other commercial surfactant, Aquatek RP2000® is a dodecyl tertiary thioethoxylate nonionic surfactant. Upon comparing the data in Tables 3 and 4, it can be seen that most of the surfactants remain in the working tank and less than 10.5% and 12.0% respectively, passes through the ultrafilter and is retained in the permeate. This is far less than the amounts for the nonionic surfactants of the present invention reported in Tables 1 and 2.

What we claim is:

1. A process for the recovery of surfactants from an aqueous surfactant/contaminant-containing solution wherein said solution is ultrafiltered at a pressure of less than 45 psi in order to recover said surfactant at high yields from the permeate for recycle and re-use, said process comprising the use of a nonionic surfactant that remains polar and solvated at the operating temperature of the ultrafiltration system.

2. The process of claim 1 wherein said nonionic surfactant is selected from the group consisting of polyoxyethyleneated alkyl phenols, polyoxyethyleneated alcohols, polyoxyethyleneated polyoxypropylene glycols, polyoxyethyleneated mercaptans, glyceryl, the polyglyceryl esters of natural fatty acids and mixtures thereof.

3. The process of claim 2 wherein the operating temperature of said ultra-filtration system is from about 90° F. to about 170° C.

4. The process of claim 3 wherein said nonionic polyoxyethyleneated alcohol comprises the structural formula:

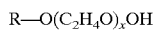

R—O(C₂H₄O)ₓOH wherein R is a $C_6$ to $C_{14}$ straight or branched chain alkyl, aryl alkylene or alkylaryl and x is a whole integer of from about 10 to 40.

5. The process of claim 3 wherein said polyoxyethyleneated polyoxypropylene glycol comprises the structural formula:

R—O(C₂H₄O)ₓH wherein R is a $C_6$ to $C_{12}$ straight or branched chain alkyl and x is a whole integer of from about 9 to 40.

6. The process of claim 3 wherein said polyoxyethyleneated mercaptan comprises the structural formula:

R—S—O(C₂H₄O)ₓH wherein R is a $C_6$ to $C_{14}$ straight or branched chain alkyl and x is a whole integer from about 9 to 14.

7. The process of claim 3 wherein said glyceryl esters of natural fatty acids comprises the structural formula:

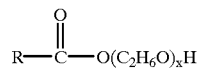

wherein R is a $C_6$ to $C_{14}$ straight or branched chain alkyl.

8. The process of claim 3 wherein said nonionic surfactant is selected from the group consisting of alkanol amine condensates, alkanolamides, polyoxyethyleneated silicones, alkyl amines, long chain acetates of polysaccharides, ethoxylated sorbitol esters, η-alkyl pyrrolidones, alkyl polyglucamides, ethylene propylene oxide copolymers (≧60% EO) and mixtures thereof.

9. A process as claimed in claim 3 wherein the amount of nonionic surfactant in said aqueous surfactant/contaminant containing solution is from about 0.01% to about 40% by weight.

10. A process as claimed in claim 9 wherein the amount of said nonionic surfactant in said aqueous surfactant/contaminant containing solution is from about 0.01% to about 10% by weight.

11. A process as claimed in claim 10 wherein the amount of said nonionic surfactant in said aqueous surfactant/contaminant containing solution is from about 0.1% to about 10% by weight.

12. The process of claim 11 wherein said surfactant/contaminant solution further comprises additional excipients selected from the group consisting of silicates, phosphates, pyrophosphates, polyphosphates and their sodium salts, $C_1$–$C_6$ lower alcohols, glycols, glycol ethers, chelating agents, thickeners such as amides, cellulose derivatives, builders such as phosphates and sequestering agents/buffers and polyacrylates, corrosion inhibitors, hydrotropes, antifoam agents, sulfates, alkyl sulfonates, phosphate esters, alkyl carboxylates, nonylphenol ethoxylates, alcohol ethoxylates, ethoxylated fatty acid amides and alkyl quaternary ammonium compounds and mixtures thereof.

13. A process according to claim 9 wherein said aqueous solution is ultrafiltered using an ultrafiltration membrane selected from the group consisting of polymeric, ceramic and metal/metal oxide membranes sintered on a ceramic support.

14. The process of claim 3 wherein said polyoxyethyleneated alkylphenols are represented by the structural formula:

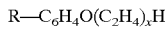

R—C₆H₄O(C₂H₄)ₓH wherein R represents a $C_6$ to $C_{12}$ straight or branched chain alkyl and x is a whole integer of from about 10 to about 40.

* * * * *